United States Patent [19]
Tsutsumi

[11] Patent Number: 5,828,942
[45] Date of Patent: Oct. 27, 1998

[54] METHOD FOR SUBJECTING MOLDED ARTICLE TO ISOSTATIC PRESSING

[75] Inventor: Taketoshi Tsutsumi, Kuwana-gun, Japan

[73] Assignee: NGK Insulators, Ltd., Nagoya, Japan

[21] Appl. No.: 824,184

[22] Filed: Mar. 26, 1997

Related U.S. Application Data

[63] Continuation of Ser. No. 412,907, Mar. 29, 1995, abandoned.

[30] Foreign Application Priority Data

Mar. 31, 1994 [JP] Japan .................................. 6-062588

[51] Int. Cl.$^6$ .............................. B22F 3/12; C04B 35/64
[52] U.S. Cl. ................................ 419/38; 419/54; 419/55; 264/56; 264/63
[58] Field of Search .................. 419/68, 38, 54, 419/55; 264/56, 63

[56] References Cited

U.S. PATENT DOCUMENTS

| | | | |
|---|---|---|---|
| 3,235,636 | 2/1966 | Trimble | 264/87 |
| 3,459,213 | 8/1969 | Schenck, Jr. et al. | 137/340 |
| 3,523,148 | 8/1970 | Boyer et al. | 264/88 |
| 4,582,682 | 4/1986 | Betz et al. | 419/68 |
| 4,588,516 | 2/1986 | Adlerborn et al. | 419/26 |
| 4,656,002 | 4/1987 | Lizenby et al. | 419/10 |
| 4,761,264 | 8/1988 | Nishio et al. | 419/68 |
| 4,883,639 | 11/1989 | Adlerborn et al. | 419/49 |
| 4,927,600 | 5/1990 | Miyashita et al. | 419/49 |
| 4,999,157 | 3/1991 | Nishio et al. | 419/68 |
| 5,129,813 | 7/1992 | Shepherd | 425/504 |
| 5,147,086 | 9/1992 | Fujikawa et al. | 228/243 |
| 5,314,646 | 5/1994 | Strobel et al. | 264/6 |
| 5,445,787 | 8/1995 | Friedman et al. | 419/38 |

FOREIGN PATENT DOCUMENTS

| | | |
|---|---|---|
| 0 133 515 A3 | 2/1985 | European Pat. Off. . |
| 0 452 936 A2 | 10/1991 | European Pat. Off. . |
| 1 608 363 | 12/1970 | Germany . |
| 41 17 415 A1 | 2/1992 | Germany . |
| 470 256 | 10/1966 | Switzerland . |

OTHER PUBLICATIONS

Hirschhorn, Joel S., "Introduction to Powder Metallurgy," 1969, pp. 107–109.

ASM Handbook, vol. 7, Powder Metallurgy, 1984, pp. 434, 444–450.

Popper, Paul "Isolated Pressing", Heyden & Son Ltd., Spectrum House, Chapt 4, pp. 33–43, 1976.

*Primary Examiner*—Daniel J. Jenkins
*Attorney, Agent, or Firm*—Kubovcik & Kubovcik

[57] ABSTRACT

A method for subjecting a molded article formed of a powder material and having a complicated shape to isostatic pressing includes covering the molded article with a water impermeable rubber film. The surface area of the rubber film is larger than the surface area of the molded article. In the method, the rubber film follows the complicated shape, e.g., a shape having notch(es), throughhole(s), dent(s), and bend (s), or a cylindrical shape, of the molded article. As a result, the rubber film is rarely damaged during isostatic pressing and the ease of removal of the rubber film after isostatic pressing is significantly improved.

15 Claims, 5 Drawing Sheets

METHOD FOR SUBJECTING MOLDED ARTICLE TO ISOSTATIC PRESSING

This application is a continuation of application Ser. No. 08/412,907, filed Mar. 29, 1995, now abandoned.

BACKGROUND OF THE INVENTION

(1) Field of the Invention

The present invention relates to the improvement of the rubber film used when a molded article is subjected to isostatic pressing.

(2) Prior Art

In powder molding which comprises molding a ceramic powder, a metal powder or the like into a desired shape, various methods are in use depending upon the desired shape and application purpose of the molded article to be obtained. The methods include, for example, pressing, injection molding, extrusion molding and casting. The molded article obtained by one of these methods is subjected to isostatic pressing after covering the article with a water-impermeable film, in order to densify the powder material and remove any large defects.

The isostatic pressing is also called cold isostatic pressing (CIP) or isotropic pressing, wherein the whole surface of a molded article is pressurized uniformly in a pressure medium. Water is generally used as the pressure medium.

In subjecting, to isostatic pressing, a molded article comprised of a powder material having a complicated shape, i.e., an article having notch(es), throughhole(s), dent(s), bend(s) and/or the like or having a cylindrical shape, a latex rubber has hitherto been used to cover the surface of the article. For example, a latex rubber has been coated on the article, or the article has been dipped in a latex rubber solution and dried. The step for covering the surface of the article with a latex rubber is repeated a plurality of times, as shown in FIG. 8.

When a molded article having its surface covered with a rubber latex as described above is subjected to isostatic pressing, a number of problems often occur including, for example, the breakage of closed holes present in the vicinity of the surface of the article, the resultant formation of open holes (defects) on the surface, the breakage of the latex rubber by the defects, the consequent penetration of a pressure medium into the article, and the formation of a lower density portion in the article. Also, since the latex rubber sags easily at the edge(s) of the molded article, insufficient coverage of the edges with latex rubber, often occurs and results in penetration of the pressure medium into the article, and the formation of a lower density portion in the article.

Further, in the step of removing the rubber after the isostatic pressing of the latex rubber-covered article, it has been necessary to remove the rubber physically (manually) and then dry up the moisture. Alternatively, the rubber can be removed by firing in a heat treatment but, in this case, a firing furnace has been necessary.

SUMMARY OF THE INVENTION

In order to solve the above-mentioned problems of the prior art, the present inventors used a bag-shaped rubber film (which has not been tried hitherto) to cover a molded article comprised of a powder material and found out that the bag-shaped rubber film can well follow molded articles of complicated shape, i.e., molded articles having notch(es), throughhole(s), dent(s), bend(s) and/or the like or having a cylindrical shape. The finding has led to the completion of the present invention.

It is an object of the present invention to provide a method for subjecting a molded article of complicated shape to isostatic pressing using the bag-shaped rubber film.

A further object of the present invention is to provide a method for subjecting a molded article to isostatic pressing without breakage of the rubber film.

According to the present invention, there is provided a method for subjecting a molded article to isostatic pressing by covering the article with a water-non-permeable rubber film, wherein the article has a complicated shape and the surface area of the rubber film is larger than the surface area of the article.

In the present method, the inside of the rubber film is preferably made a vacuum.

Further, the molded article is preferably made substantially of a ceramic or a metal.

In the present invention, there can be used, as the rubber film, for example, a commercial ice bag or a commercial semi-translucent rubber tube. The term "ice bag" refers to known bags used for cooling the affected part of a patient by placing ice chips or water therein.

In the present invention, the surface area of the rubber film is larger than the surface area of the molded article. This requirement cannot be met in the case of covering the molded article with a latex, because the surface area of the resulting rubber film is equal to the surface area of the molded article. Herein, the surface area of the rubber film is measured when the rubber film is tightly adhered to the article. In view of, for example, the necessity of sealing the rubber film to draw a vacuum inside the film, the surface area of the rubber film must be larger than the surface area of the molded article.

BRIEF DESCRIPTION OF THE DRAWINGS

FIG. 7B is a drawing when the rotor is viewed from below, and FIG. 7A is a sectional view of the rotor taken at the P-P' line of FIG. 7B.

DETAILED DESCRIPTION OF THE PREFERED EMBODIMENTS

The present invention is hereinafter described in more detail by way of Examples. However, the present invention is not restricted by these Examples.

Examples 1–3 and Comparative Examples 1–3

Figure 1:
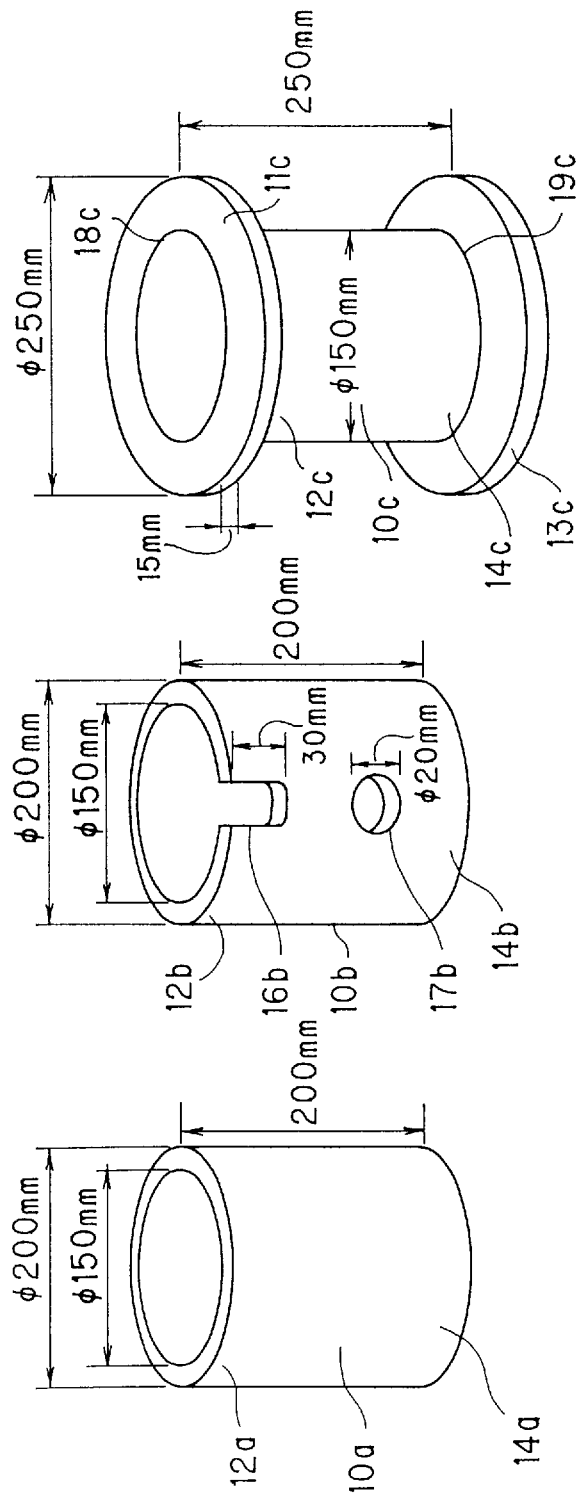
FIG. 1A, FIG. 1B and FIG. 1C are drawings showing molded articles to which the present invention is applicable.

FIG. 1 shows examples of parts to which the present invention is applicable. Each of FIG. 1A, FIG. 1B and FIG. 1C shows a molded article having a cylindrical shape.

In the molded article comprised of a powder materials of FIG. 1A, the side wall 10a surrounds a space extending from the end 12a to the end 14a in the axial direction, at the circumference of the space. Both the end 12a and the end 14a are open.

In the molded article of FIG. 1B, the side wall 10b surrounds a space extending from the end 12b to the end 14b in the axial direction, at the circumference of the space. A notch 16b is formed at the end 12b, and a throughhole 17b extending in the diameter direction of the molded article is formed in the side wall 10b. Both the end 12b and the end 14b are open. If desired, two or more notches or two or more throughholes may be formed.

In the molded article of FIG. 1C, the side wall 10c surrounds a space extending from the end 12c to the end 14c in the axial direction, at the circumference of the space. At the end 12c and the end 14c are provided a flange 11c and a flange 13c, respectively, each having ring shape. Both the end 12c and the end 14c are open. The flange 11c and the side wall 10c are in contact at the bend 18c, and the flange 13c and the side wall 10c are in contact at the bend 19c.

There were mixed 100 parts by weight of a silicon nitride powder, 1.5 parts by weight of a $SrCO_3$ powder, 4.4 parts by weight of a MgO powder and 5.5 parts by weight of a $CeO_2$ powder all having an average particle diameter of 0.6 μm. 100 parts by weight of the resulting compound was mixed with 2 parts by weight of a polyvinyl alcohol (a binder). The resulting mixture was spray-dried to obtain a powder having an average particle diameter of 50 μm. The powder was molded, by the use of a press and a mandrel, to obtain a cylindrical molded article having the shape shown in FIG. 1A.

Then, in order to remove the polyvinyl alcohol therefrom, the molded article was subjected to degreasing at 500° C. for 10 hours in an atmosphere consisting of 50% by weight of nitrogen and 50% by weight of air.

The molded article after degreasing was cut to form a notch 16b and a throughhole 17b to obtain an article having the shape shown in FIG. 1B. Incidentally, a dent may be formed in place of the throughhole, by cutting the side wall to an extent that no throughhole is formed.

Separately, the portion of the side wall excluding the two ends was cut at the outside to form a flange 11c and a flange 13c to obtain an article having the shape shown in FIG. 1C. These flanges may be formed by bonding.

Figure 2:
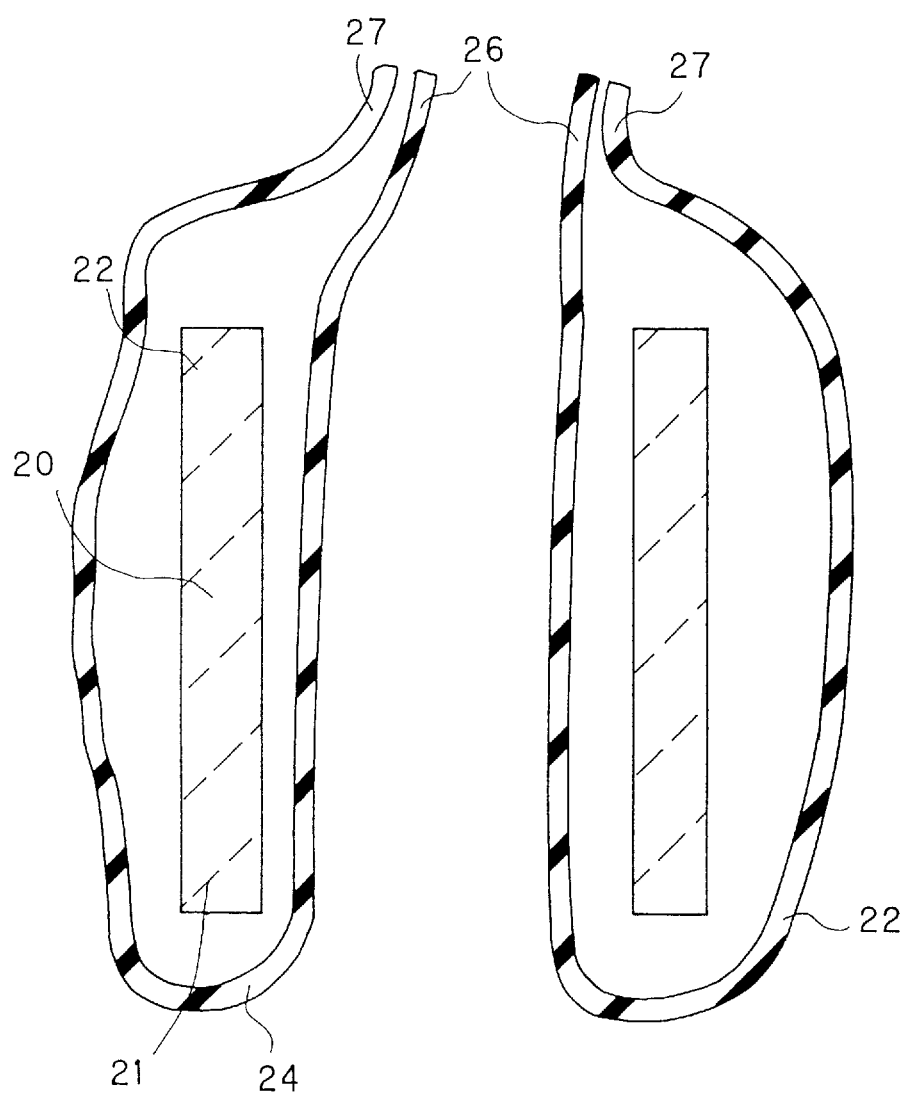
FIG. 2 is a drawing showing an example of the application of the present invention to a molded article.

Next, each of the three molded articles was covered with a semi-translucent rubber tube. The tube had a thickness of about 1 mm. FIG. 2 is a drawing showing a state in which molded article 20 having a cylindrical shape is covered with a rubber tube 24. As the rubber tube 24, there was used, for example, a commercial semi-translucent rubber tube having high stretchability and elasticity. The article 20 was inserted into the rubber tube 24; the rubber tube 24 was folded back, at one end 21 of the article 20, into the inside (hollow portion) of the article 20; and one end 26 of the rubber tube 24 was taken out from the other end 22 of the article 20. Then, the one end 26 and an end 27 corresponding thereto were adhered to each other with a rubber paste.

Degassing was conducted from other end 26 of the rubber film 24 by the use of a vacuum pump or the like to draw a vacuum inside of the rubber film 24. Thereafter, the other end 26 and an end 27 corresponding thereto were adhered to each other with a rubber paste. A vacuum is necessary to allow the rubber tube 24 to tightly adhere to the surface of the powder-molded material 20. The adhesion between the end 26 and the end 27 is necessary to avoid the leakage of a pressure medium into the rubber tube 24 during isostatic pressing.

The rubber tube 24 and the article 20 were allowed to stand for about 5 minutes to confirm that there was no leakage from the rubber tube 24. Then, isostatic pressing was conducted at a pressure of 7,000 $kgf/cm^2$. As the pressure medium, there was used a 50:50 (by weight) mixed solution consisting of water and ethylene glycol.

Thereafter, sintering was conducted at 1,700° C. for 3 hours in a nitrogen atmosphere of 9.5 atom.

Figure 8:
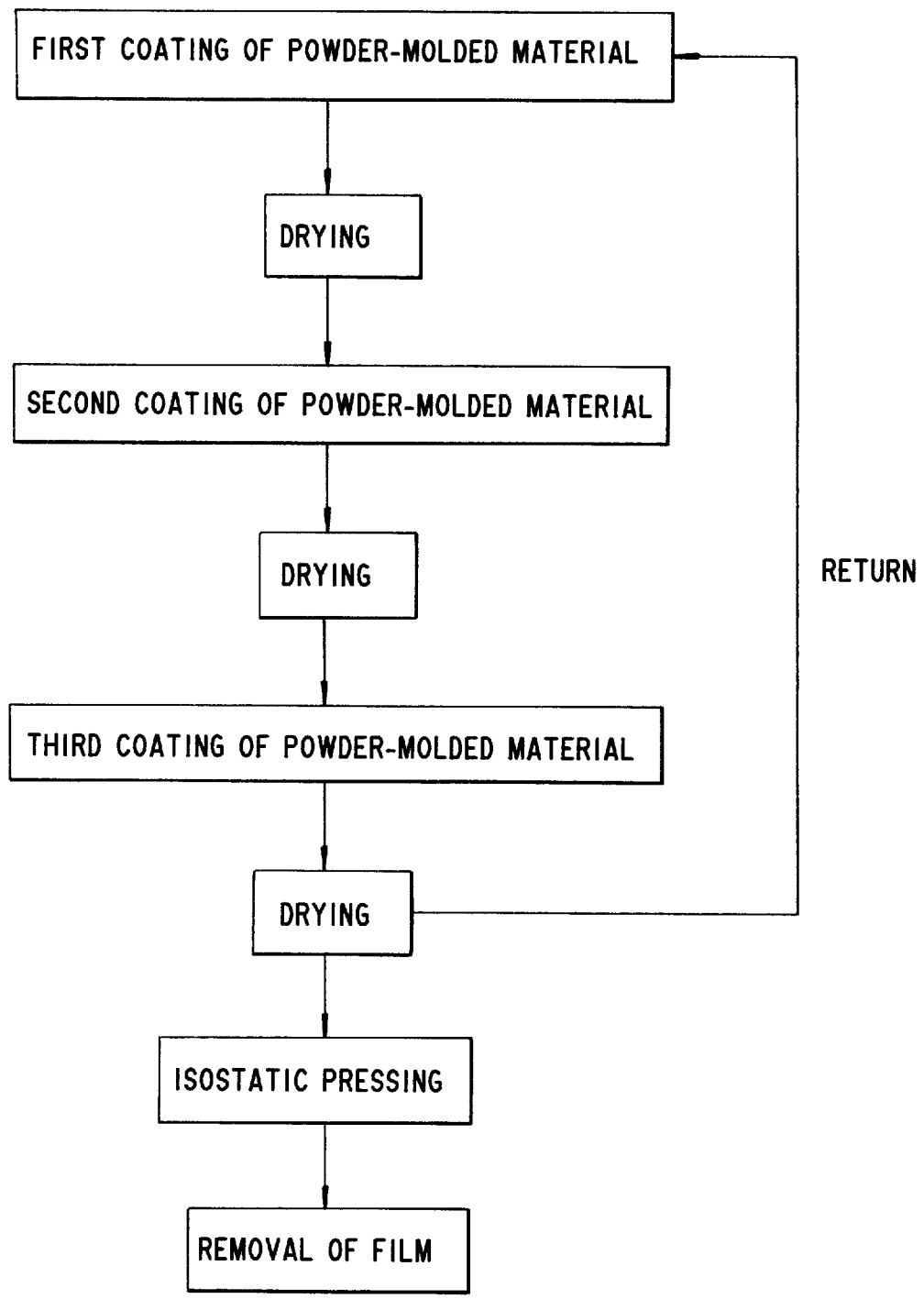
FIG. 8 is a conventional procedure used for covering a molded article with a rubber.

Meanwhile, in Comparative Examples 1–3, the production of each molded article, the isostatic pressing step and the sintering step were the same as in Examples 1–3 but the method of rubber film formation was different In Comparative Examples 1–3, a latex rubber was brush-coated in a thickness of about 0.2 mm according to the procedure shown in FIG. 8.

In Comparative Examples 1–3, each molded article after isostatic pressing had several discolored areas each of 2–30 mm in diameter. At these areas, the latex rubber was broken and, as a result, the pressure medium penetrated into the molded article. The number of these areas was larger at the ends, notch, throughhole and bends than at the side wall.

Figure 3:
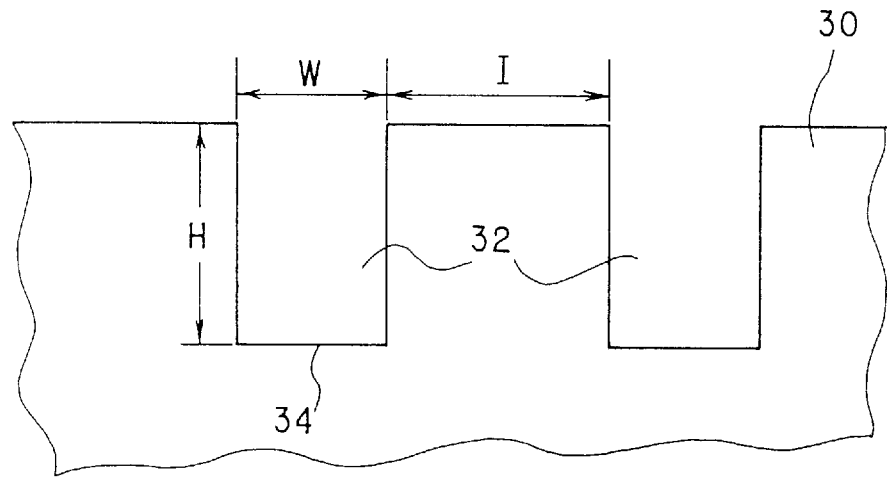
FIG. 3 is a drawing showing the notches of a molded article to which the present invention is applicable.

FIG. 3 shows notches 32 formed in molded article 30. Description is made on the conditions under which the present invention is favorably applicable to such an article 30. The height H of each notch 32 is preferably two times or less the width W of the notch, more preferably 1.6 times or less the width W because such a height enables easy adhesion of a rubber film to the bottom 34 of the notch 32. For the same reason, the distance I between two adjacent notches 32 is preferably at least the same as the width W of the notch 32, more preferably at least 1.5 times the width W, most preferably at least 2 times the width W.

Figure 4A:
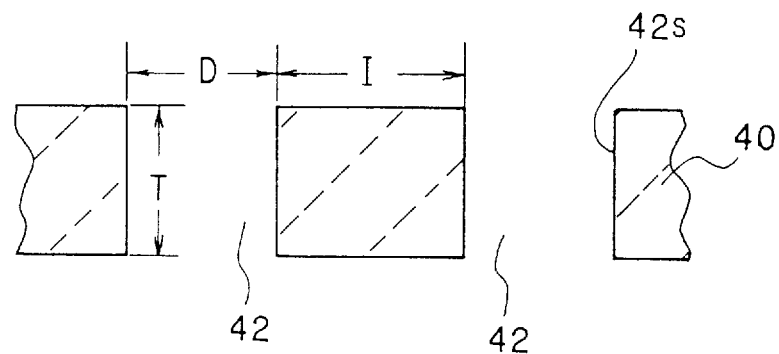
FIG. 4A and FIG. 4B are drawings showing the throughholes of a molded article to which the present invention is applicable.
Figure 4B:
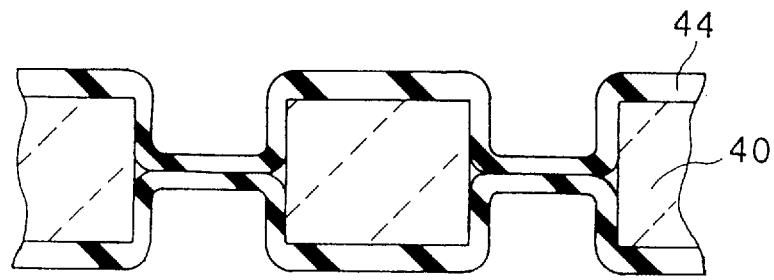

FIG. 4A and FIG. 4B show throughholes 42 formed in the side wall 40 of a molded article. Description is made on the conditions under which the present invention is favorably applicable to such a molded article. The thickness T of the side wall 40 is preferably 2 times or less the diameter D of each throughhole 42, preferably 1.6 times or less the diameter D, because such a thickness enables easy adhesion of a rubber film to the surface 42S of the throughhole 42. For the same reason, the distance I between two adjacent throughholes 42 is preferably at least the same as the diameter D of the throughhole 42, more preferably at least 1.5 times the diameter D, most preferably at least 2 times the diameter D.

Examples 4–5 and Comparative Examples 4–5

Figure 5:
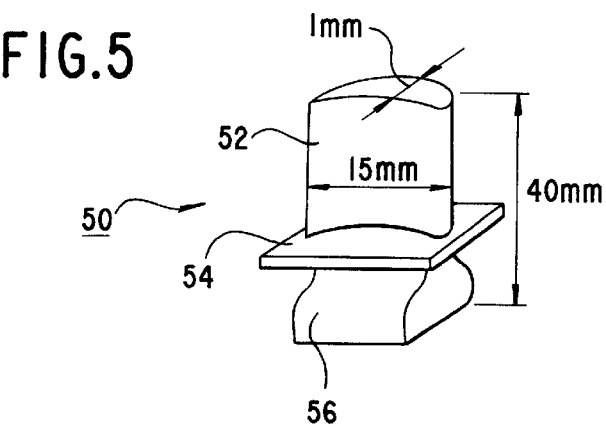
FIG. 5 is a drawing showing a dynamic blade of a gas turbine to which the present invention is applicable.

As examples of small-sized molded articles having a complicated shape to which the present invention is applicable, a dynamic blade 50 and a static blade 60 both of a gas turbine are shown in FIG. 5.

In FIG. 5, the dynamic blade 50 comprises a blade 52, a shroud 54 bonded to the blade 52, and a root 56 bonded to the shroud 54. The shroud 54 has a plate shape; on one side of the plate is provided the blade 52; and on the other side of the plate is provided the root 56. The horizontal section of the blade 52 is streamlined and tapered along the flow of a fluid.

Figure 6:
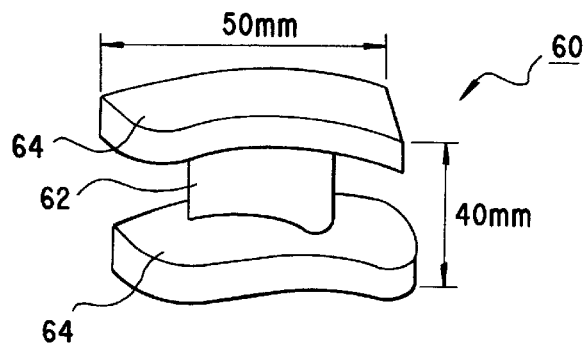
FIG. 6 is a drawing showing a static blade of a gas turbine to which the present invention is applicable.

In FIG. 6, the static blade 60 comprises a blade 62 and a pair of shrouds 64. The horizontal section of the blade 62 is streamlined and tapered along the flow of a fluid.

There were mixed 100 parts by weight of a silicon nitride powder, 2 parts by weight of a $SrCO_3$ powder, 3 parts by weight of a MgO powder and 3 parts by weight of a $CeO_2$ powder all having an average particle diameter of 1.0 μm. To 100 parts by weight of the resulting compound was added 20 parts by weight of an organic binder. The organic binder had a melting point of 62° C. and was composed mainly of a paraffin wax. The resulting mixture was subjected to injection molding to obtain molded article 50.

The molded article was completely buried in an inorganic powder placed in a stainless steel vat. The inorganic powder was composed mainly of cordierite, and was dried beforehand and had a water content of not higher than 1%. Then, the buried molded article was subjected to degreasing. The degreasing step consisted of the following operation. Firstly, the molded article was subjected to temperature elevation from room temperature to 60° C. at a rate of 1° C./hr and kept at 60° C. for 30 minutes. Then, the resulting article was subjected to temperature elevation from 60° C. to 180° C. at a rate of 2° C./hr and kept at 180° C. for 20 hours. Lastly, the resulting article was subjected to temperature elevation from 180° C. to 450° C. at a rate of 3° C./hr, kept at 450° C. for 10 hours, and cooled from 450° C. to room temperature.

The article after degreasing was subjected to machining (e.g., shaving off of edges). The resulting three molded articles (three dynamic blades or three static blades) were placed in one ice bag. The ice bag had a thickness of about 0.2–0.3 mm. The inside of the ice bag was made a vacuum by a vacuum pump or the like to an extent that each molded article made no movement in the ice bag, after which the mouth of the ice bag was closed and sealed physically. Then, the ice bag was allowed to stand for about 5 minutes to confirm that the ice bag had no leakage. Owing to no leakage, an excellent yield was possible in Examples 4–5.

Thereafter, isostatic pressing was conducted in the same manner as in Examples 1–3; the ice bag was removed; and sintering was conducted in the same manner as in Examples 1–3.

Meanwhile, in Comparative Examples 4–5, the production of the molded article, the isostatic pressing step and the sintering step were conducted in the same manner as in Examples 4–5. However, only the formation of a rubber film was different; that is, a latex rubber was brush-coated according to the procedure shown in FIG. 8. In Comparative Examples 4–5, each molded article after isostatic pressing showed discoloration at several areas (these areas had a diameter of 2–30 mm); at these areas, the latex rubber was broken and a pressure medium penetrated into the molded article. The number of these areas was larger at the edges than at the side wall.

Example 6 and Comparative Example 6

Figure 7A:
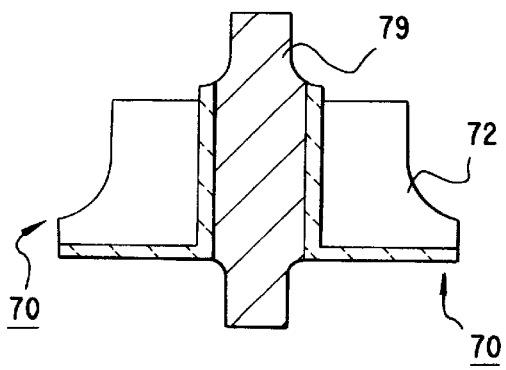
FIG. 7A and FIG. 7B are drawings showing a rotor of turbine to which the present invention is applicable.
Figure 7B:
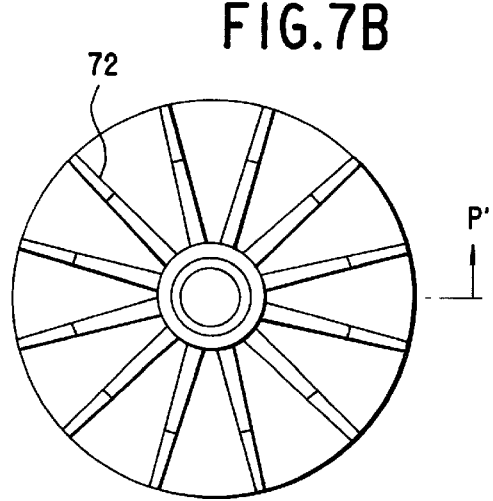

In each of Example 6 and Comparative Example 6, a turbine rotor shown in FIG. 7A and FIG. 7B was produced by injection molding. The production process was the same as in Examples 4–5 and Comparative Examples 4–5 except for the difference in the shape of the molded article.

In FIG. 7A and FIG. 7B, the turbine rotor 70 is provided about a shaft 79 which is a part independent from the turbine rotor 70. The turbine rotor 70 comprises a plurality of blades 72 extending outwardly from the shaft 79 in the shaft diameter direction. Each blade 72 is a curved plate.

The results (including the yield after molding) of Examples 1–6 and Comparative Examples 1–6 are shown in Table 1.

TABLE 1

| | Molded material | Kind of rubber film | Time of film formation (hr/samples) | Penetration of pressure medium (areas/samples) | Yield |
|---|---|---|---|---|---|
| Example | | | | | |
| 1 | FIG. 1A | Semi-translucent rubber tube | 0.5/1 | 0/30 | 100 |
| 2 | FIG. 1B | Semi-translucent rubber tube | 0.5/1 | 0/30 | 100 |
| 3 | FIG. 1C | Semi-translucent rubber tube | 0.5/1 | 0/30 | 100 |
| 4 | FIG. 5 | Ice bag | 0.2/3 | 0/230 | 100 |
| 5 | FIG. 6 | Ice bag | 0.2/3 | 0/230 | 100 |
| 6 | FIG. 7A and FIG. 7B | Balloon-shaped rubber | 0.2/1 | 2/10 | 80 |
| Comparative Example | | | | | |
| 1 | FIG. 1A | Latex rubber | 1.5/1 | 10/13 | 23 |
| 2 | FIG. 1B | Latex rubber | 1.5/1 | 12/15 | 20 |
| 3 | FIG. 1C | Latex rubber | 1.5/1 | 9/13 | 30 |
| 4 | FIG. 5 | Latex rubber | 0.4/3 | 41/100 | 59 |
| 5 | FIG. 6 | Latex rubber | 0.4/3 | 38/100 | 62 |
| 6 | FIG. 7A and FIG. 7B | Latex rubber | 2/1 | 4/10 | 60 |

In the present invention, a molded article comprised of a powder material having a complicated shape, for example, a molded article having notch(es), throughhole(s), dent(s) or bend(s) or having a cylindrical shape is covered with a rubber film having a surface area larger than the surface area of the molded article and then subjected to isostatic pressing. As a result, the breakage of the rubber film during isostatic pressing has been reduced significantly and the ease of removal of the rubber film after isostatic pressing has been improved.

What is claimed is:

1. A method for subjecting a molded article comprised of a powder material and having a complicated shape to isostatic pressing, the method comprising the step of covering the molded article with a water impermeable rubber film having a thickness of 0.2–1 mm, the rubber film having a surface area larger than a surface area of the molded article.

2. A method according to claim 1, further comprising the step of drawing a vacuum inside of the rubber film.

3. A method according to claim 1, wherein the molded article is made substantially of a ceramic.

4. A method according to claim 1, wherein the molded article is made substantially of a metal.

5. A method according to claim 2, wherein the molded article is made substantially of a ceramic.

6. A method according to claim 2, wherein the molded article is made substantially of a metal.

7. A method for isostatically pressing a molded article, the method comprising the steps of:

provide a molded article comprised of a powder material and having a complicated shape;

covering said molded article with a rubber envelope, said rubber envelope being elastic and impermeable to a liquid medium used for cold isostatic pressing, said rubber envelope having a thickness of 0.2–1 mm and a surface area larger than a surface area of said molded article, and said rubber envelope having a shape selected from the group consisting of a bag shape having one open end and a tubular shape having a first open end, a second open end, and a hollow portion extending from said first open end to said second open end; and cold isostatically pressing said molded article with said rubber envelope in the liquid medium.

8. A method according to claim 7, further comprising, prior to the step of cold isostatic pressing, the step of applying a vacuum to the inside of said rubber envelope.

9. A method according to claim 7, wherein said molded article includes at least one of a notch, a throughhole, a dent, and a bend.

10. A method according to claim 7, wherein said molded article has a shaft and a plurality of blades extending outwardly from said shaft.

11. A method according to claim 7, wherein said molded article is comprised of a ceramic powder.

12. A method according to claim 7, wherein said molded article is comprised of a metallic powder.

13. A method according to claim 7, wherein said rubber envelope has said tubular shape.

14. A method according to claim 9, wherein said rubber envelope has said tubular shape.

15. A method according to claim 10, wherein said rubber envelope has said tubular shape.

\* \* \* \* \*